Dec. 24, 1929.     L. M. SHERIDAN     1,740,788
VARIABLE SPEED DRIVING MECHANISM
Filed May 28, 1928
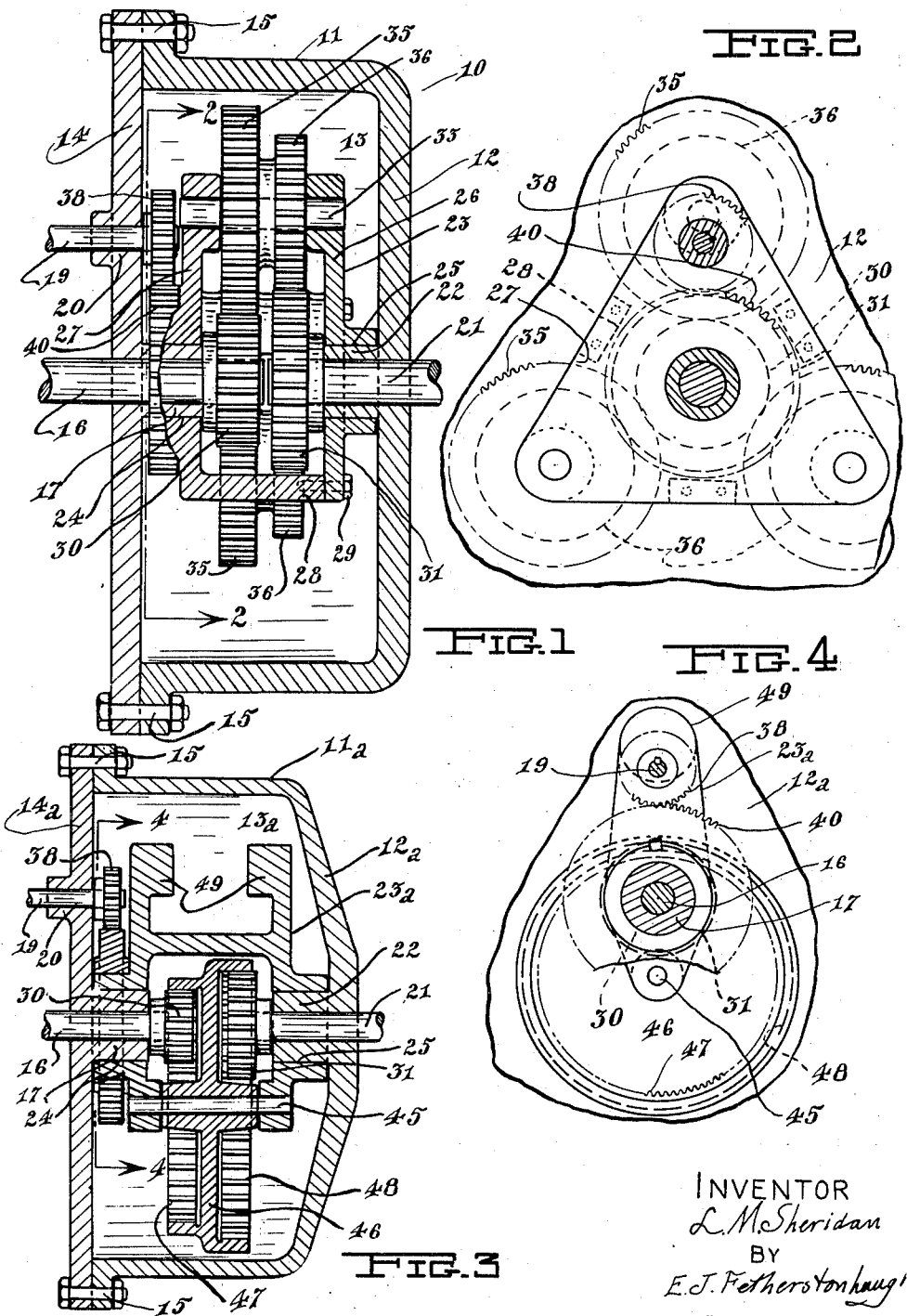
INVENTOR
L. M. Sheridan
BY
E. J. Fetherstonhaugh
ATTORNEY Patented Dec. 24, 1929

1,740,788

UNITED STATES PATENT OFFICE

LESLIE MITCHELL SHERIDAN, OF COPPERCLIFF, ONTARIO, CANADA

VARIABLE-SPEED DRIVING MECHANISM

Application filed May 28, 1928. Serial No. 281,090.

This invention relates to a variable speed drive, as described in the present specification and illustrated in the accompanying drawings which form part of same.

The invention consists essentially of the novel features pointed out in the claim for novelty following a description containing an explanation in detail of an acceptable form of the invention.

The objects of the invention are to construct in a power transmission means whereby the speed of rotation of the driven shaft may be readily changed at will; to afford in a device of this description a positive gear drive in a variable speed device; to compensate for any slippage which may occur due to overloading the friction part of the driving members; to build a speed change mechanism having a large range of speed changes and through which a much larger amount of power may be transmitted than formerly in a device of its size and weight; and generally, to provide a device of this nature, simple in construction, efficient in its results, and capable of accomplishing the aforesaid purposes.

In the drawings, Figure 1 is a vertical section view taken through the central axis of the device.

Figure 2 is a fragmentary section view taken on lines 2—2 in Figure 1.

Figure 3 is a vertical section view taken through the central axis of a modified form of the device.

Figure 4 is a fragmentary section view taken on lines 4—4 in Figure 3.

Like numerals of reference indicate corresponding parts in the various figures.

Referring to the drawings, 10 is the device complete consisting of the outer cylindrical casing 11, which may be made with the two parts 12 forming the recessed portion 13 and the plate 14 enclosing said recessed portion and bolted to the portion 12 as at 15. Suitable lugs or brackets may be formed on either the portions 12 or 14 for securing to and supporting in a suitable frame the drum or cylinder 11. 16 is a main driving shaft directly driven from the main source of power and centrally supported and journalled in the plate 14 as at 17. 19 is an auxiliary driving shaft which may be actuated by any of the well known types of variable friction drives from the main source of power or by variable speed electric motor, steam turbine, or the like, and is journalled in the plate 14 as at 20. 21 is the driven shaft situated in alignment with the main driving shaft 16 and journalled in the portion 12 as at 22. The journalling portions 17 and 22 extend inwardly from the plate 14 and the portion 12, respectively, substantially as shown in Figure 1. Journalled on these extended portions 17 and 22 is a hollow cage or frame 23 rotatably mounted on said extensions 17 and 22 as at 24 and 25, respectively, and in the axis of the shafts 16 and 21. The member 23 may be formed of the two portions 26 and 27 secured together at the cross pieces 28 by the bolts 29. The member 23 may be formed with the portions 26 and 27 cast integral with each other or formed substantially as shown. The construction shown in Figure 1 affords better means for machining and finishing of the different bearing surfaces. Fixed on the shaft 16 and adjacent the inner face of the cage or member 23 is a gear 30. A larger gear 31 is similarly fixed on the shaft 21. The shafts 16 and 21 are spaced from each other at their adjoining ends to prevent friction. At regular intervals in the cage 23, shafts 33 are mounted equidistant from the central axis. Gears 35 are rotatably mounted on said shaft 33 and mesh with the gear 30. Reduced gears 36 rigid with and driven by the gear 35 are similarly mounted on the shaft 33 and mesh with the gear 31 on the shaft 21. A gear 38 is rigidly mounted on the auxiliary driving shaft 19 and adjacent the inner face of the plate 14 and meshes with and drives a gear 40 mounted in the central axis of the cage or member 23 and rigid therewith.

In Figures 3 and 4, a modified form of the invention is disclosed, in which 11A is a cylindrical casing similar to that shown in Figures 1 and 2 and consists of the portion 12A having the recessed portion 13A and the enclosing plate 14A bolted to said member 12A as at 15. The main driving shaft 16 and the auxiliary driving shaft 19 are similarly located and journalled as at 17 and 20, respectively. 21 is the driven shaft centrally located as in the former case, and journalled as at 22. A gear 38 is similarly fixed on the shaft 19 and drives a gear 40 located in the central axis and secured to a cage or member 23A journalled on the inwardly extending portions 17 and 22, as in the former case. The member 23A is preferably cast in one piece. A shaft 45 is rigidly supported in said cage 23A and at a suitable distance from the central axis. The gears 30 and 31 are rigidly mounted on the shafts 16 and 21, respectively, and adjacent the respective inner faces of the member 23A. An internal gear 46 is rotatably mounted on the shaft 45. A reduced internal portion 47 formed on one side of the gear 46 meshes with the gear 30, the internal portion 48 formed on the other side of the gear 46 having a greater inner periphery than the portion 47 and meshing with the larger gear 31. Weights or counterbalances 49 are formed on the member 23A opposite the shaft 45 and its mounting on the member 23A and effectively counterbalances the weight of the gear 46 with its mounting so that vibration will be reduced to a minimum and the member 23 bearing the gear 46 and shaft 45 will always be properly balanced on its journalling at 24 and 25 on the members 17 and 22, respectively.

In the operation of this invention, the main driving shaft 16 may be rotated at a constant speed at all times. If the auxiliary shaft remains stationary, the member 23 will also remain stationary and a certain fixed speed reduction from the shaft 16 to the shaft 21 through the train of gears 30 to the enlarged gear 35 driving the reduced gear 33 in turn driving the enlarged gear 31 secured to the driven shaft, is obtained.

In the modified form of the invention, in place of the several gears 35 and 36, one double internal gear 46 is provided, having the reduced internal gear portion 47 engaging the main driving gear 30 and the larger internal gear portion 48 engaging the driven gear 31. If the auxiliary driving shaft 19 remains stationary and a constant driving speed be given to the shaft 16, a constant speed will be given the driven shaft 21 through the double internal gear 46.

There are several different methods of mounting a train of planetary gears in a rotatable cage so that said gears may be rotated about the main driving and driven gear members by an auxiliary driving means, without going beyond the scope of this invention, but the two methods shown in the drawings are the most satisfactory for accomplishing the desired results.

What I claim is:

In a variable speed driving mechanism, a casing forming a gear box and having shaft bearings, a drive shaft journalled in said gear box and at its central axis, an auxiliary drive shaft journalled in said gear box and adjacent said drive shaft, a driven shaft journalled in said gear box and opposite said drive shaft and in alignment therewith, a gear casing rotatably journalled in said gear box and in the axis of said drive shaft and said driven shaft, a gear rigidly mounted on said auxiliary driving shaft and meshing with a gear secured to said gear casing and at its central axis, a gear rigidly mounted on said drive shaft and in said gear casing, a gear of greater diameter mounted on said driven shaft and in said gear casing, a plurality of gears journalled on shafts mounted at regular intervals in said gear casing and equidistant from the centre and meshing with said gear on said driving shaft, each fixed to a reduced gear similarly mounted and meshing with said gear on said driven shaft.

Signed at the city of Toronto, this 19th day of April, 1928.

LESLIE MITCHELL SHERIDAN.